(12) United States Patent  (10) Patent No.: US 6,641,124 B2
Melanson  (45) Date of Patent: Nov. 4, 2003

(54) PIPE ALIGNING DEVICE

(76) Inventor: Jerry Melanson, 613 Riverside Dr. NW., High River, Alberta, T1V 1S8 (CA)

( * ) Notice: Subject to any disclaimer, the term of this patent is extended or adjusted under 35 U.S.C. 154(b) by 0 days.

(21) Appl. No.: 10/057,097

(22) Filed: Jan. 23, 2002

(65) Prior Publication Data
US 2003/0137092 A1 Jul. 24, 2003

(51) Int. Cl.7 .................................................. B25B 1/20
(52) U.S. Cl. ........................ 269/43; 269/131; 228/49.3; 29/272
(58) Field of Search .............................. 269/43, 131, 8, 269/130, 132, 108, 91, 93; 228/49.3, 44.5, 49.1; 29/272, 281.1, 281.5, 282, 464; 285/21, 22, 411, 286

(56) References Cited

U.S. PATENT DOCUMENTS

| | | | | |
|---|---|---|---|---|
| 3,704,503 A | * | 12/1972 | Haywood | 29/200 |
| 3,797,094 A | * | 3/1974 | Combs | 29/237 |
| 3,898,714 A | | 8/1975 | McFadden | |
| 4,011,979 A | * | 3/1977 | Hagen | 228/49 |
| 4,586,647 A | | 5/1986 | Dearman | |
| 4,623,085 A | | 11/1986 | Dearman | |
| 4,726,575 A | | 2/1988 | Dearman | |
| 4,750,662 A | | 6/1988 | Kagimoto | |
| 4,934,673 A | * | 6/1990 | Bahler | 269/43 |
| 5,165,360 A | | 11/1992 | Moody | |
| 5,865,430 A | | 2/1999 | Conover et al. | |
| 6,092,271 A | * | 7/2000 | Stojkovic | 29/281.5 |
| 6,264,406 B1 | * | 7/2001 | Bowles | 408/92 |
| 6,378,187 B1 | * | 4/2002 | Walker | 29/281.5 |
| 6,382,496 B1 | * | 5/2002 | Harger | 228/44.3 |

* cited by examiner

Primary Examiner—George Nguyen
Assistant Examiner—Daniel Shanley
(74) Attorney, Agent, or Firm—Gene Scott-Patent Law & Venture Group

(57) ABSTRACT

A clamping device for aligning confronting ends of a pair of pipe members having a joint therebetween, provides a support member for acting against one of the pipe members, a flexible clamping member having a first and second end and of such length as substantially to encircle one of said pipe members when positioned adjacent to the joint; an anchor member axially moveable relative to the support member; a coupler for releaseably coupling the first end of the clamp member to the anchor member; attachment device carried by the anchor member for releasable attachment of a portion of the clamp member that has been attached to the coupler, a section of the clamp member forming a loop. The section selected to be in conjunction with the support member to clampingly encircle, substantially, the circumference of one of the pipe members. An adjusting device is used for radially applying force to the clamp member to effect expansion and contraction of the loop, the adjusting device reacting by moving the anchor member axially relative to the support member.

4 Claims, 7 Drawing Sheets

PIPE ALIGNING DEVICE

BACKGROUND OF THE INVENTION

1. Field of the Invention

The present invention relates to a device for aligning the confronting ends of a pair of pipe members in order to position the pipe members for welding.

2. Description of Related Art

In welding the confronting ends of a pair of pipe members, it is desirable to axially align the pipe members prior to accomplishing the welding in order to ensure a good quality, even weld. Before welding the two pipe members, the confronting ends, of the pipe members are therefore preferably positioned so as to minimize variations in wall thickness, configuration and other irregularities. This can best be accomplished by bringing a first pipe member in coaxial position with a second pipe member and providing support for the confronting ends of both pipes and a means to keep the two pipe members in a fixed position relative to each other. It is also frequently desirable to adjust the shape of at least one of the two pipe members by applying force to minimize difference in configuration between the two ends of the confronting pipe members.

Various devices for use in aligning the confronting ends of a pair of pipe members are known to the prior art. Among the known clamps are the devices disclosed in U.S. Pat. Nos. 3,898,714; 4,586,647; 4,623,085; 4,726,575; 4,750,662; 5,165,360; and 5,865,430.

The devices disclosed in these patents typically include little adaptability for pipes of varying diameters. In addition they generally include and require many individual parts, resulting in a complicated assembly and disassembly process and consequently in costly time losses. Further the known devices are heavy and large making it difficult to transport these devices. Therefore, there is a need in the art for an improved device which permits the alignment of the confronting ends of a pair of pipe members

SUMMARY OF THE INVENTION

The present invention provides a clamping device for the alignment of the confronting ends of a pair of pipe members comprising: a support member for acting against one of said pipe members; a flexible clamping member having a first and second end and of such length as to substantially encircle said one of said pipe members when positioned adjacent said joint; an anchor member axially moveable relative to said support member; coupling means for releaseably coupling said first end of said clamp member to said anchor member; attachment means carried by said anchor member for releasable attachment of a portion of said clamp member that has been attached to said coupling means and extended forming a loop, said portion selected in conjunction with said support member to substantially encircle the circumference of said one of said pipe members; adjusting means for radially applying force to said clamp member to effect expansion and contraction of said loop, said adjusting means reacting by moving said anchor member axially relative to said support member.

The invention further provides a magnetic device for aligning confronting ends of a first and a second pipe member, said device comprising: an elongated member containing a magnetic material for attachment to said first pipe member, said elongated member projecting laterally relative to said pipe members and comprising an adjustable force applying means to radially apply force to said second pipe member.

The two alignment devices provided by the present invention may either be used alone or in combination with each other.

Further objects and advantages of the present invention will appear from the following description, taken together with the accompanying drawings.

BRIEF DESCRIPTION OF THE DRAWINGS

The invention will be described in greater detail with reference to the accompanying drawings, which illustrate a preferred embodiment of the invention and wherein.

DETAILED DESCRIPTION OF THE INVENTION

Figure 1:
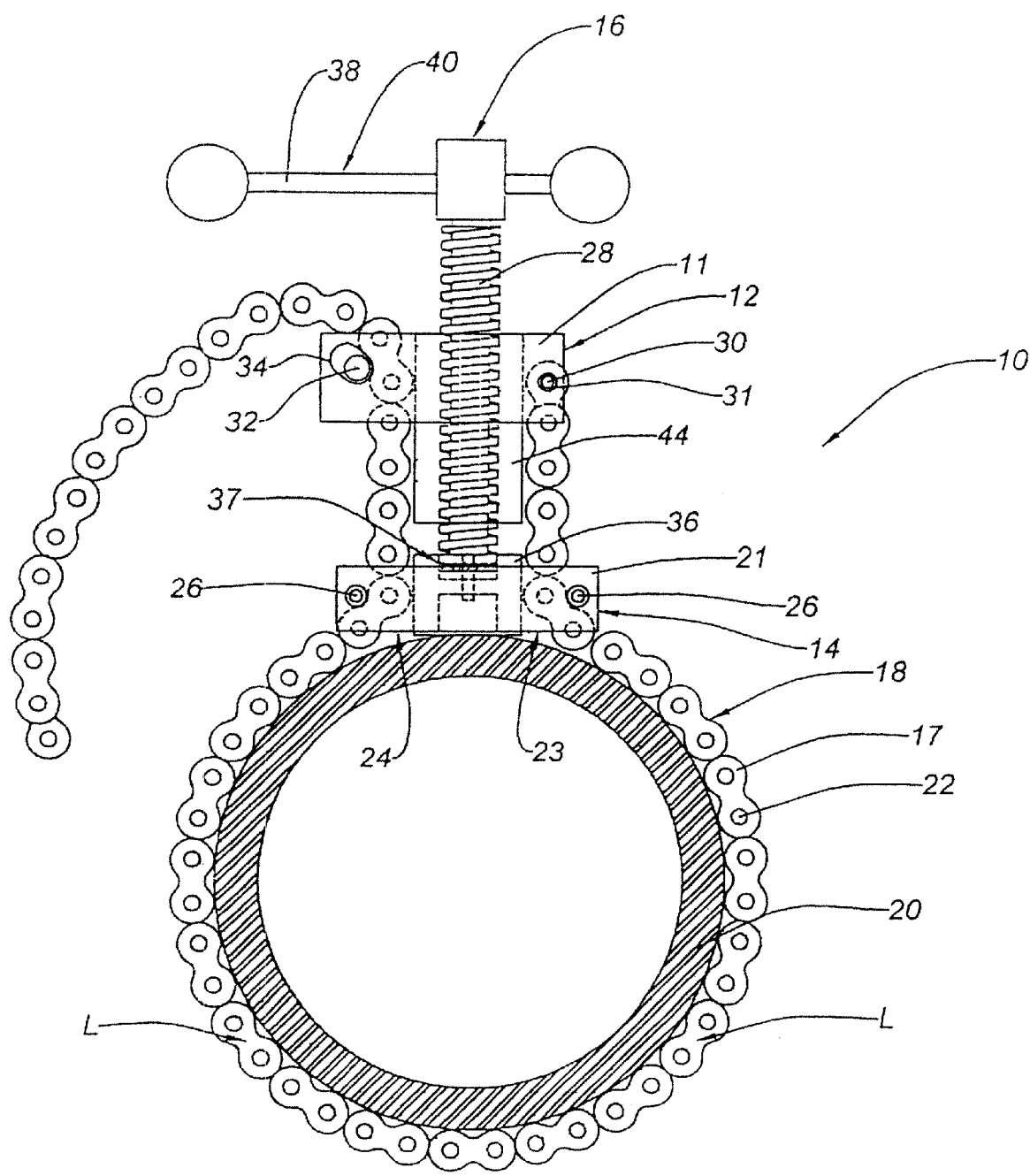
FIG. 1 is a sectional view shown in elevation and illustrating the present invention clamping device in operative condition.
Figure 2:
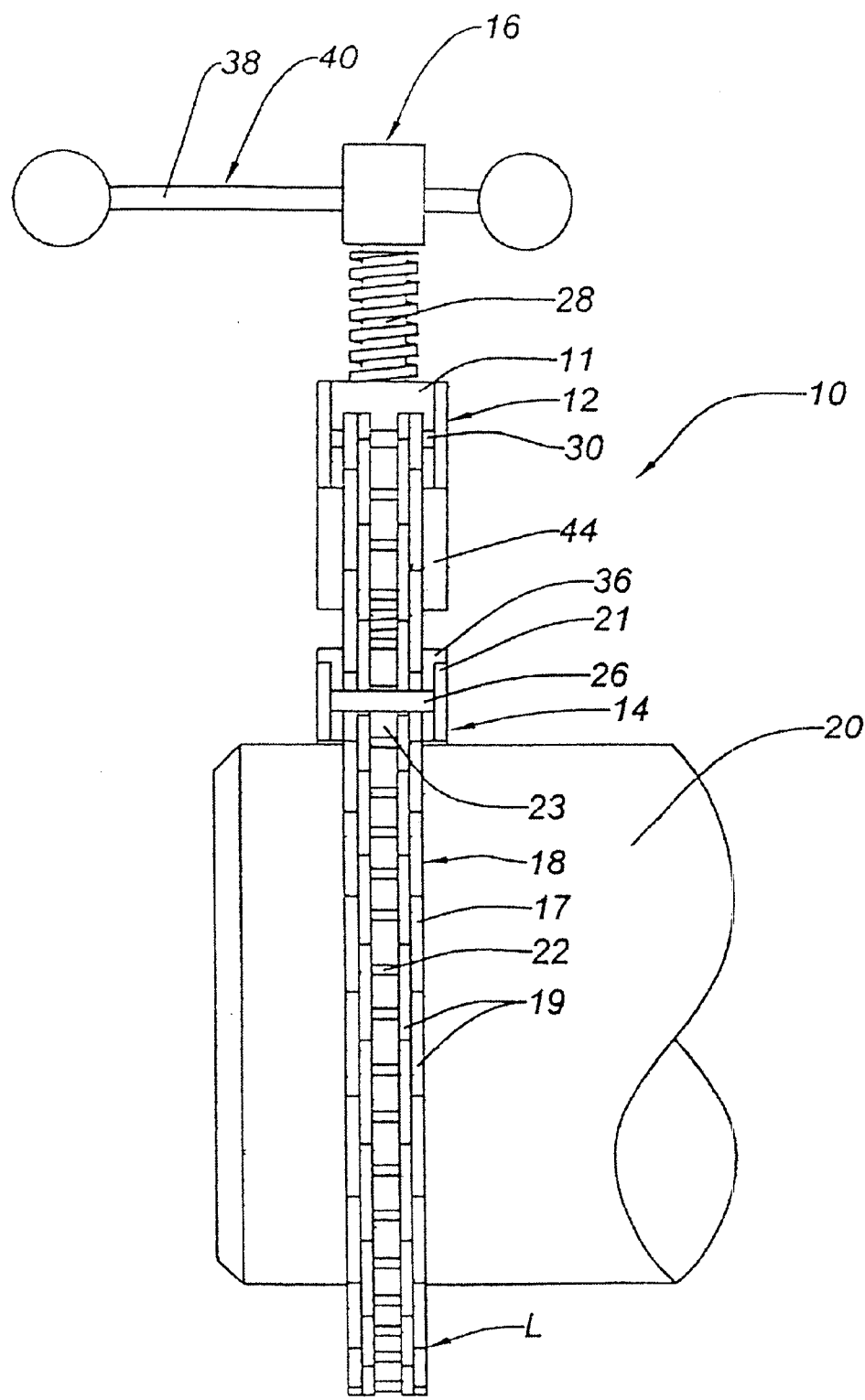
FIG. 2 is a side elevational view thereof.

As hereinbefore mentioned the present invention provides devices for the alignment of the confronting ends of two pipe members.

Accordingly, in one aspect the invention provides an alignment device comprising a flexible chain member which is clampingly positioned about a pipe. The clamping device comprises a limited amount of separate parts. Therefore the clamping device provided by the present invention is easy to assemble and disassemble. Further the clamp can be manufactured as a portable, light-weight device. The clamping device is particularly suitable for use in combination with pipes of greatly varying diameters.

In another aspect, the present invention provides a magnetic device for the alignment of the confronting ends of two pipe members. One or more magnetic devices may either be used alone or in combination with the clamping device to align the pipe members.

Referring to the drawings now, the clamping device for aligning two confronting pipe members 20 and 25 is generally indicated by reference 10 and comprises, essentially, a support member 14, an anchor member 12, a flexible clamping member or chain 18, and an adjusting means 16.

Figure 3:
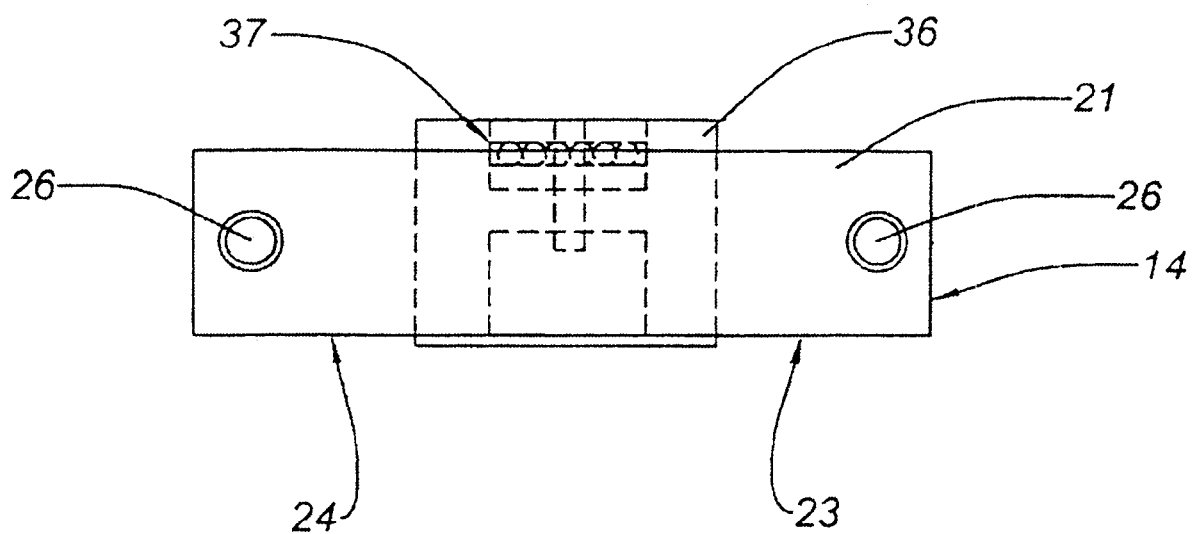
FIG. 3 is a fragmentary side view of a support member thereof generally indicated by reference numeral 14 in FIGS. 2 and 3.

The support member 14 comprises a preferably rectangular body 21 acting radially through a cylindrical member 36 attached centrally and positioned within the body 21 against the pipe member 20, as is best shown in FIG. 3. The cylindrical member 36 defines a bearing 37, for receiving the bolt 28 of the adjusting means 16, which will be described in more detail hereinafter. The support member 14 further defines a first aperture 23 and a second aperture 24 adjacent to the site of action of the support member 21 against the pipe 20 through which the clamping member 18 is threaded. The first aperture 23 and second aperture 24 are defined by cylinder 36 and two pins 26, axially fixed in to the body 21 of the support member 14. The size of the first aperture 23 and second aperture 24 are such as to accommodate the chain member 18 therein.

The clamping member 18 defines a first and second end preferably containing a leaf chain 17 having parallel rows of links 19 mounted on pins 22 as is conventional. At the first end of the chain 17, the links 19 are pivoted by a coupling member 30. The second end of the chain is free.

Figure 4:
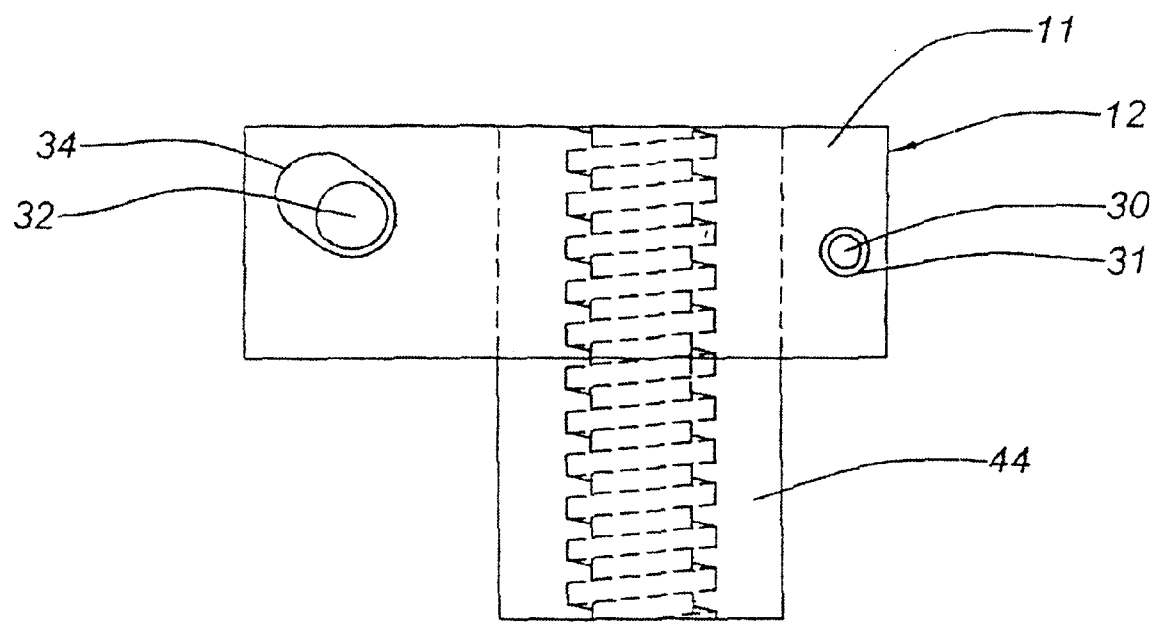
FIG. 4 is a fragmentary side view of an anchor member thereof generally indicated by reference numeral 12 in FIGS. 2 and 3.

The anchor member 12 comprises a preferably rectangular hollow body 11, that is movable relative to the support member 14 as is best shown in FIG. 4. The threaded bolt 28 of the adjustment means 16 extends axially through a threaded shaft in the anchor member 12. The anchor member rests on a hollow threaded cylindrical expansion 44 through which the threaded bolt 28 moveably rotates. The anchor member 12 is attached to the adjustment means 16 thereby allowing relative movement between the anchor member 12 and the support member 14. The arrangement is such that rotation of the crank 40 of the adjustment means 16 using the handles 38 will result in axial movement of the anchor member relative to the support member 14.

The anchor member further contains a removable pin 30 fitting through an opening 31 for attachment of the first end of the chain member 18. Attachment of the chain of any selected section of the chain member 18 following extension through the first and second apertures 23 and 24 of the support member is accommodated through a pin 32 resting in an opening 34 in the anchor member.

To condition the clamping device for use, the pin 30 is removed from the opening 31 and the first end of chain 18 is attached on the anchor member whereupon the pin 30 is returned in to opening 31. The free end, defined by the support member 14; is extended about the pipe 20, threaded through aperture 24 defined by the support member to form a loop L about the pipe 20 and locked into position on the anchor member using the pin 32. The loop L maintains the chain member 18 in its loosely embracing relationship with the pipe 20. The crank 40 may then be moved in such a direction as to rotate the threaded bolt 28 thereby causing the anchor member to move axially relative to the support member 14. Such movement will cause contraction of the loop L and clamping of the chain tightly about the pipe 20. In conjunction with the support member 14, the chain 18 clampingly encircles substantially the circumference of the pipe member 20.

After clamping of the chain 18 tightly about the pipe 20, the pipe member 25 is moved into confronting relation with the pipe member 20 and the two pipe members may be welded together using conventional welding means.

The clamping chain 18 may conveniently be manufactured in different lengths so as to enable a pipefitter to align pipes of vastly differing diameters. In each instance the same support member 14, anchor member 12 and adjustment means 16 may be used, thereby obviating the need for multiple loop forming devices and adjustment means where pipes of differing diameters need to be fitted for welding.

To remove the clamping device from the pipe, it is necessary only to reverse the procedure described above in applying the clamp to the pipes.

Figure 5:
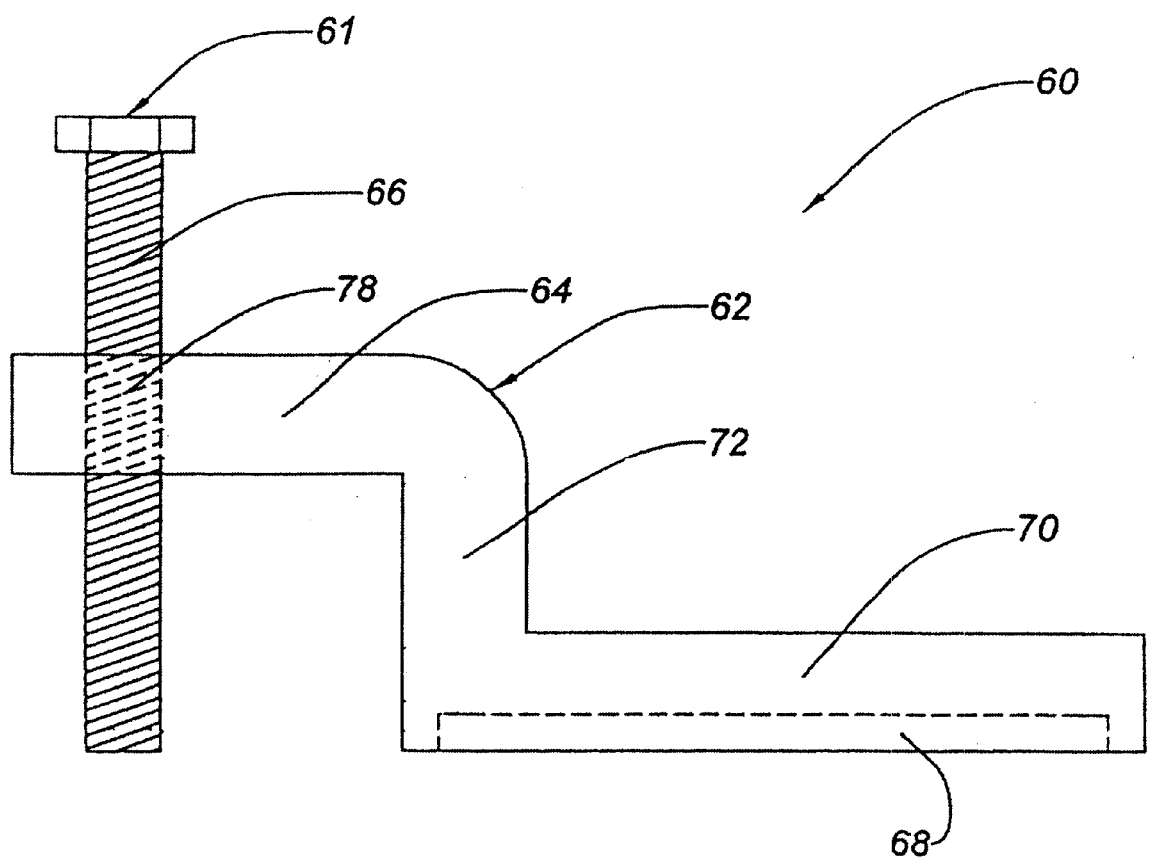
FIG. 5 is a side view illustrating a magnetic alignment device thereof.
Figure 6:
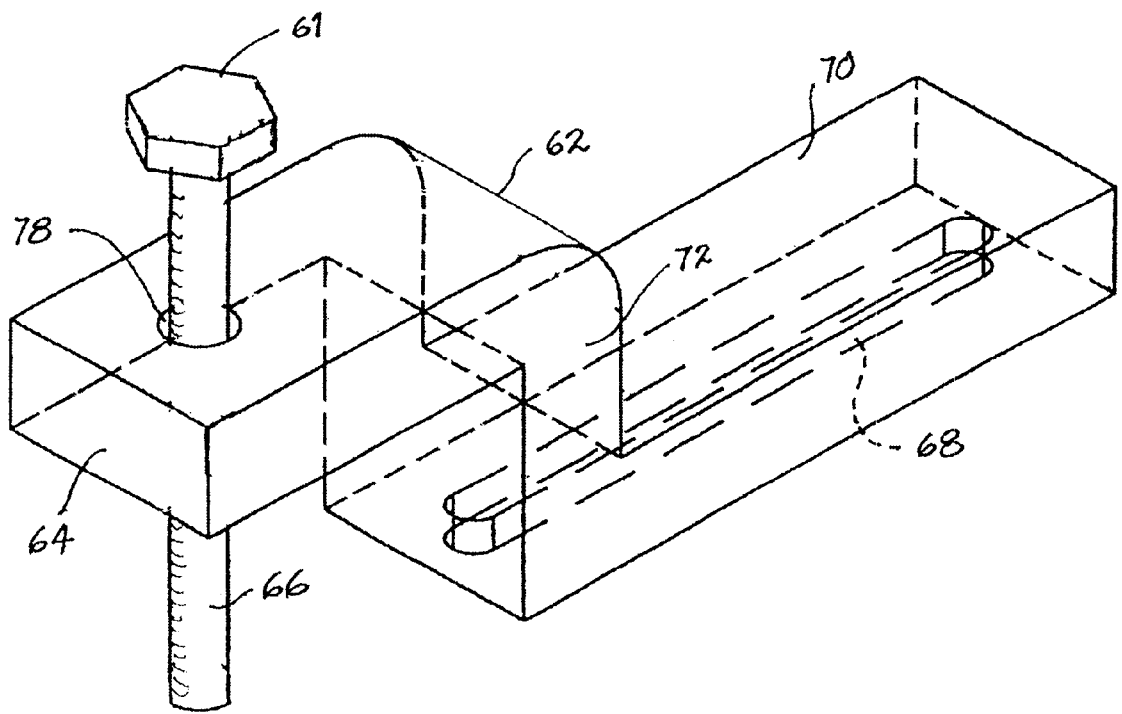
FIG. 6 is a perspective view of the magnetic alignment device thereof.

The present invention also provides magnetic alignment devices generally indicated by reference 60 and shown in FIG. 5 and FIG. 6. Each of the devices 60 comprises an elongated metal member 62 projecting laterally and a force applying means 61. The magnetic device further comprises a magnetic member 68. The elongated metal member comprises a first planar section 70 terminating in a second planar section 72 perpendicular to planar section 70 and a third planar section 64 which lies in a plane with the first planar section 70. Planar section 70 comprises a magnetic member 68 for releasable magnetic attachment of the magnetic alignment device to the pipe member 20. The planar section 64 defines a threaded aperture 78, through which a threaded bolt 66 extends in axial direction. The threaded bolt may be rotated so as to cause the bolt to axially extend and apply axial force against the pipe member 25.

Figure 7:
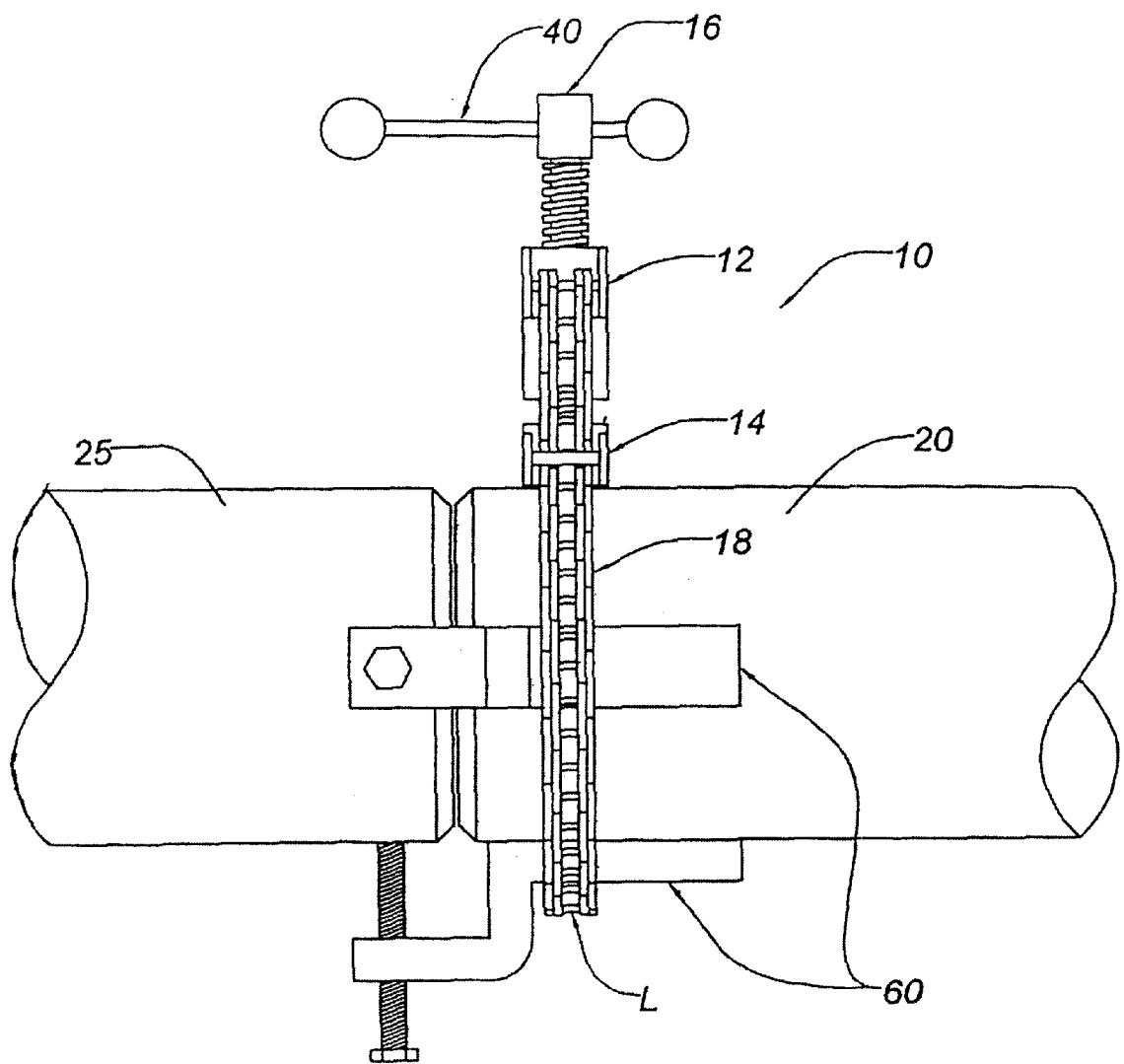
FIG. 7 is a side elevation view illustrating the combined use of the magnetic alignment device and clamping device thereof.

In accordance with the present invention, it is also possible to, use the magnetic devices in conjunction with the clamping device as generally shown in FIG. 7. To use the devices in conjunction, one or more of the magnetic alignment devices 60 are first positioned on the first pipe member 20, and the clamping alignment device 10 is then installed as previously described, with the loop L, however, encircling the portion of the magnetic device magnetically attached to the pipe member 20. Following clamping of the chain tightly about the pipe 20, pipe 25 is moved into confronting relation with pipe 20 and the force applying means 61 of the magnetic device 60 is manipulated so that they engage pipe member 25 until the two pipe members are substantially coaxial or the difference between the two pipes are minimized. If desirable the force applying means 61 may be adjusted radially relative to the pipe members so as to reform the configuration of the confronting end of the pipe member 25.

Following positioning of the pipe members and reshaping as desired, the two pipe members may be welded together by conventional welding means.

It is to be appreciated that what has been described is a preferred embodiment of the present invention. Variations will be apparent to those skilled in the art adapting the present invention to specific circumstance.

What is claimed is:

1. An alignment apparatus comprising: a flexible chain member clampingly positioned about a pipe; a support member; an anchor member; and an adjusting means; the support member comprising a rectangular body acting radially through a cylindrical member attached centrally and positioned within the rectangular body and against the pipe; the cylindrical member including a bearing, adapted for receiving a bolt of the adjusting means; the support member further defining a spaced apart first aperture and a second aperture through which ends of the chain member are threaded, the bolt engaged with the bearing for rotation in drawing the support member and anchor member apart, thereby tightening the chain member about the pipe; the apparatus further comprising a magnetic alignment device having an elongated metal member projecting laterally and a force applying means, the elongated metal member providing a first planar section terminating in a second planar section perpendicular to the first planar section, and further providing a third planar section coplanar with the first planar section.

2. The device of claim 1 wherein the anchor member comprises a rectangular hollow body, axially adjustable toward and away relative to the support member.

3. The device of claim 1 wherein the bolt of the adjustment means extends axially through a threaded shaft in the anchor member.

4. The device of claim 3 wherein the anchor member is attached to the adjustment means such that rotation of a crank of the adjustment means results said axial movement of the anchor member relative to the support member.

* * * * *